Figure 1:
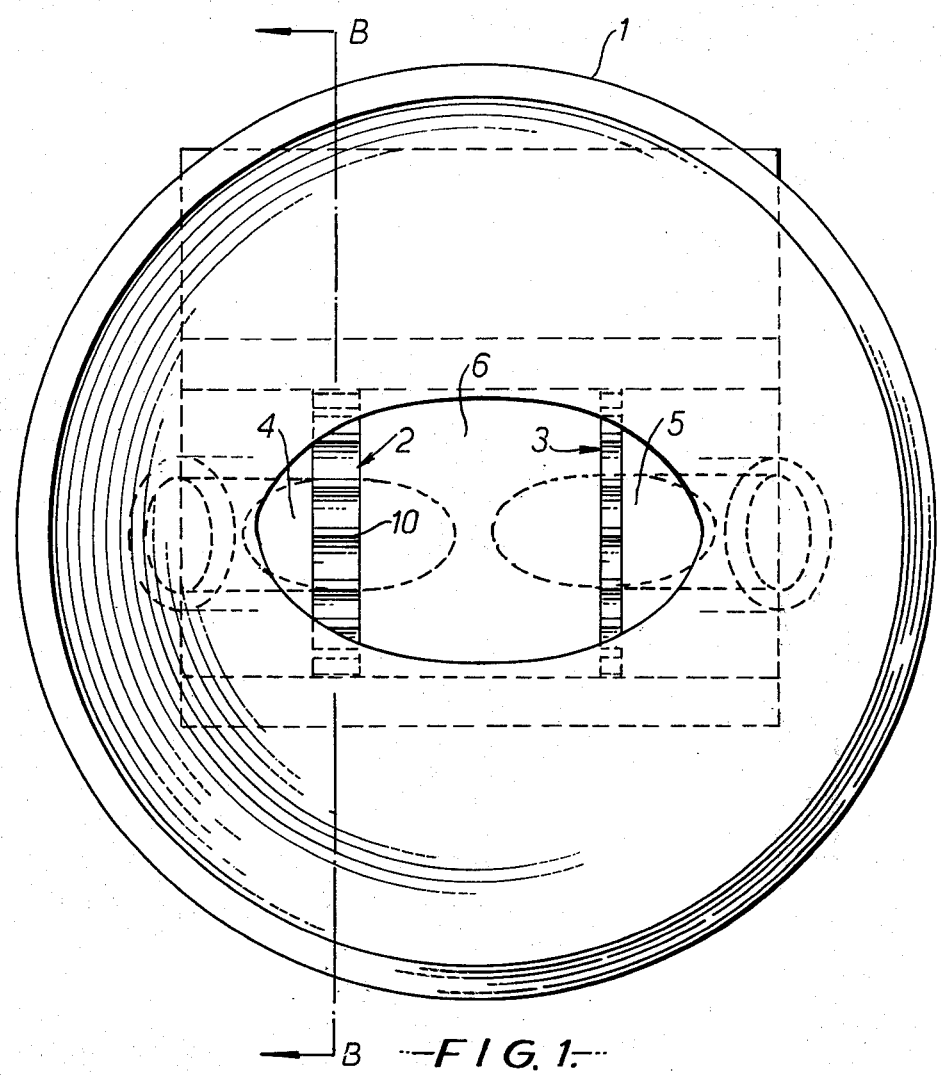

United States Patent [19]

Farmery

[11] 3,999,692
[45] Dec. 28, 1976

[54] APPLICATOR OF GRANULAR MATERIALS

[75] Inventor: Horstine Farmery, North Newbald, England

[73] Assignee: Horstine Farmery Limited, North Newbald, England

[22] Filed: June 11, 1975

[21] Appl. No.: 585,745

[30] Foreign Application Priority Data

June 14, 1974 United Kingdom ............ 26432/74

[52] U.S. Cl. .............................................. 222/368
[51] Int. Cl.[2] ........................................ G01F 11/10
[58] Field of Search .......... 222/368, 363, 369, 273

[56] References Cited

UNITED STATES PATENTS

| | | | |
|---|---|---|---|
| 2,792,152 | 5/1957 | Crowley et al. | 222/368 X |
| 2,808,181 | 10/1957 | Oehler et al. | 222/368 |
| 2,899,111 | 8/1959 | Christensen | 222/368 X |
| 3,391,831 | 7/1968 | Wolf | 222/368 X |
| 3,704,816 | 12/1972 | Gandrud | 222/368 |

Primary Examiner—Allen N. Knowles
Attorney, Agent, or Firm—Bacon & Thomas

[57] ABSTRACT

A metering body, for use with a machine for distributing granular materials and wherein a metering body is rotatably supported and includes peripheral recesses which, when the metering body is rotated, are successively filled with granular material from a supply source of the machine, peripherally closed by an internal surface of the machine, and then exposed to discharge their granular contents to a discharge for the machine, said metering body comprising a rigid core with a substantially central bore, for receiving a driving shaft of the machine, coated on its external surfaces with a plastics material and with circumferentially spaced, peripheral recesses in said plastics material defining the granular material conveying recesses for the metering body.

6 Claims, 3 Drawing Figures

APPLICATOR OF GRANULAR MATERIALS

This invention relates to machines for distributing metered quantities of granular material and has particular application to machines for distributing granular material on the ground which machines are commonly called "applicators."

A successful applicator is described in the specification of U.S. Pat. No. 902,594 which has a metering and feeding mechanism comprising at least one fluted member capable of being made fast to a driving shaft and located between annular members made fast to the tubular part of the hopper in which the fluted member(s) rotates effectively to close the ends thereof and prevent spillage of the powder or granular material. There may be two fluted members with a smooth surface non-rotatable spacing member therebetween to make up the distance between the inner ends of said non-rotatable annular members. The two fluted members may feed to two separate delivery or discharge tubes or outlet.

In a preferred form of such applicator the driving shaft has a square or other flat-face cross-sectional shape matching the shape of the central apertures in the fluted members, a cylidrical distance member with a circular central aperture is located on the shaft between the fluted members and is prevented from rotating, and the end closure annular members each comprise a bush through which the shaft is a sliding fit. The shaft is rotatable in a bearing shell capable of being made fast to and closing off the part of the hopper in which the material metering mechanism rotates.

Normally the fluted wheels are metallic and, whilst satisfactory for powder and soft granular materials, difficulty is encountered when handling hard and abrasive granular materials as granules not wholly within the spaces between flutes tends to be broken by the hard flutes passing the edge of the metallic hopper lower end part in which the fluted wheels rotate; and the flutes may themselves be damaged. To avoid these difficulties attempts have been made to provide fluted wheels with plastics material flutes but the metal cores of such wheels, like the all metal wheels, tended to jam with the adjacent surfaces of the end annular members and the intermediate cylindrical spacing member.

Now therefore the object of the present invention is to provide for a machine for distributing metered quantities of granular material a fluted wheel or wheels with substantially the same axial rigidity of metallic wheels but with lower jamming characteristics and with the advantage of flexible material construction for the flutes.

According to the present invention there is provided a metering body, for use with a machine for distributing granular materials and wherein a metering body is rotatably supported and includes peripheral recesses which, when the body metering is rotated, are successively filled with granular material from a supply source of the machine, peripherally closed by an internal surface of the machine, and then exposed to discharge their granular contents to a discharge outlet for the machine, said metering body comprising a rigid core with a substantially central bore for receiving a driving shaft of the machine, coated on it's external surfaces with a plastic material and with circumferantially spaced, peripheral recesses in said plastics material defining the granular material conveying recesses for the metering body.

Preferably the rigid core is of annular configuration and the bore includes at least one flat surface for engagement with a corresponding driving surface on the metering body drive shaft of the machine.

Preferably said rigid core presents to the plastics coating material, surfaces inclined to the intended direction of rotation for the body and said inclined surfaces are defined by recesses or holes in the rigid core and said recesses or holes are filled with the plastics coating material.

Preferably the rigid core is metallic.

The plastics material is preferably polyurethane, e.g. that sold under the Registered Trade Mark "DESMOPAN".

The invention also envisages a machine including the metering body in accordance with the invention.

Figure 2:
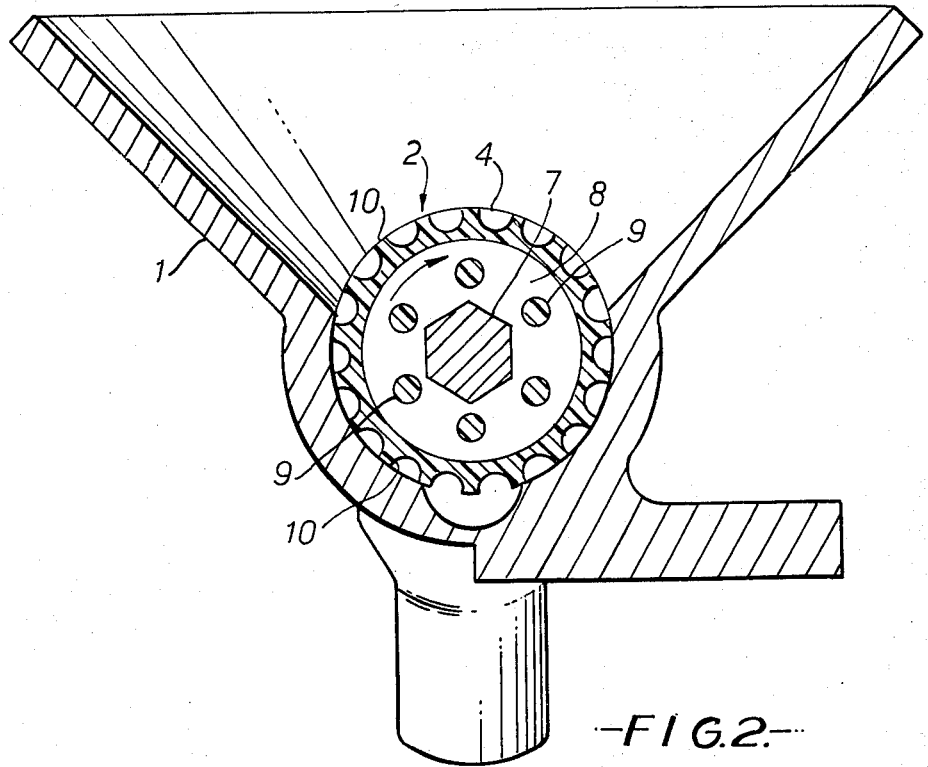
Figure 3:
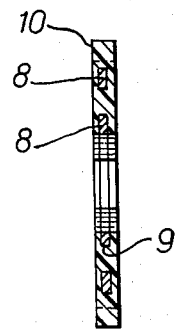

The invention will now be described further by way of example with reference to the drawings, accompanying the Provisional Specification in which:

FIG. 1 is a plan of the casting forming the lower end part of a hopper with its metering mechanism comprising two fluted wheels each discharging to a separate outlet, FIG. 2 is a section on the line B—B of FIG. 1 looking in the direction of the arrow, and FIG. 3 is a cross-section through a fluted metering wheel.

The hopper lower end casting 1 is of known form with a metering mechanism comprising, in the illustrated embodiment, two fluted metering wheels 2,3 between non-rotatable annular end members, 4,5 and with a non-rotatable annular spacing member 6 between said wheels. The wheels 2 and 3 each have a nexagonal central aperture to engage with a driving shaft 7 of like cross-sectional shape. The members 4,5 and 6 present cylindrical central apertures within which shaft 7 can rotate.

Each fluted metering wheel comprises a metal disc 8, with the above described hexagonal central aperture and with a ring of apertures 9, which forms the core of a plastics material moulding forming flutes 10 and intergral covering of the opposite radial surfaces of the disc 8. Further, the plastics material fills the apertures 9 to providing abutting surfaces between the disc 8 and the plastics material inclined to the direction of rotation for the wheel.

The flutes of such metering wheel have a degree of flexibility which is less disruptive of the granular materials to be metered whilst the side covering effectively prevent such wheel jamming with the abutting surface of the end members 4,5 and of any intermediate member 6, which otherwise occurs due to fines of the granular material getting between such surfaces.

What I claim is:

1. A metering body, for use with a machine for distributing granular materials and wherein a metering body is rotatably supported and includes peripheral recesses which, when the body is rotated, are successively filled with granular material from a supply source of the machine, peripherally closed by an internal surface of the machine, and then exposed to discharge their granular contents to a discharge for the machine, said metering body comprising a rigid core with a substantially central bore, for receiving a driving shaft of the machine, said core being coated on its external peripheral and axial end surfaces with a plastics material and with circumferentially spaced, peripheral recesses in the peripheral portion of only said plastics material defining the granular material conveying recesses for the metering body.

2. A metering body as claimed in claim 1 in which said core is provided with holes and said holes are filled with the plastics coating material.

3. A metering body as claimed in claim 1, in which the plastics material is polyurethane.

4. A combination as set for the in claim 1 in which the metering body is mounted for rotation between two non-rotable surfaces of the machine, which surfaces are in sliding engagement with the plastic material on the axial end surfaces of the body.

5. A combination as set forth in claim 4 in which said non-rotatable surfaces are defined by non-rotatable annular members, concentric to the metering body and having maximum diameters substantially equal to that of the metering body.

6. A metering body as claimed in claim 1 in which the circumferentially spaced perpheral recesses are formed by flutes of plastic material radially outstanding from the metering body.

* * * * *